United States Patent [19]

Dolan

[11] Patent Number: 5,658,960
[45] Date of Patent: Aug. 19, 1997

[54] POLYTETRAFLUOROETHYLENE MOLDING RESIN AND PROCESSES

[75] Inventor: John W. Dolan, Boothwyn, Pa.

[73] Assignee: W.L. Gore & Associates, Inc., Newark, Del.

[21] Appl. No.: 323,462

[22] Filed: Oct. 12, 1994

Related U.S. Application Data

[63] Continuation-in-part of Ser. No. 21,409, Feb. 23, 1993, abandoned.

[51] Int. Cl.$^6$ .................... C08J 9/22; C08J 09/16
[52] U.S. Cl. .................... 521/57; 521/59; 525/189; 525/199
[58] Field of Search ............ 525/189, 199; 521/57, 59

[56] References Cited

U.S. PATENT DOCUMENTS

| | | |
|---|---|---|
| 3,953,412 | 4/1976 | Saito et al. . |
| 3,953,566 | 4/1976 | Gore . |
| 3,981,853 | 9/1976 | Manwiller .................... 526/255 |
| 4,379,858 | 4/1983 | Suzuki . |
| 4,454,249 | 6/1984 | Suzuki et al. .................... 521/54 |
| 4,714,748 | 12/1987 | Hoashi et al. . |
| 4,770,922 | 9/1988 | Hatakeyama et al. . |
| 4,882,113 | 11/1989 | Tu et al. .................... 264/127 |
| 5,071,609 | 12/1991 | Tu et al. . |
| 5,110,527 | 5/1992 | Harada et al. . |
| 5,118,788 | 6/1992 | Hosokawa et al. .................... 528/503 |
| 5,156,343 | 10/1992 | Sueyoshi et al. . |
| 5,242,765 | 9/1993 | Naimer et al. . |
| 5,403,524 | 4/1995 | Burger et al. .................... 264/22 |
| 5,429,869 | 7/1995 | McGrigor et al. .................... 428/364 |

FOREIGN PATENT DOCUMENTS

| | | |
|---|---|---|
| 0106180 | 9/1983 | European Pat. Off. . |
| 1082859 | 10/1964 | United Kingdom . |
| 1082859 | 9/1967 | United Kingdom . |

*Primary Examiner*—Helen Lee
*Attorney, Agent, or Firm*—Gary A. Samuels

[57] ABSTRACT

In this invention a new form of polytetrafluoroethylene has been found to be compression moldable to provide strong molded articles. It is also useful as an additive or strength binder. The new form is a compression molding powder comprised of comminuted, sheared particles of expanded porous polytetrafluoroethylene, said particles having a modular-microfibrillar structure of irregular shape, and a mean particle size between 5 and 500 micrometers, and having a coating of a thermoplastic fluoropolymer on at least a portion of the particle. By irregular shape is meant that the nodes and fibrils do not have an ordered arrangement. The bulk density is about 0.06 to 0.2 g/cc.

3 Claims, 3 Drawing Sheets

200 X

POLYTETRAFLUOROETHYLENE MOLDING RESIN AND PROCESSES

CROSS-REFERENCE TO RELATED APPLICATIONS

This application is a continuation-in-part of application Ser. No. 08/021,409, filed Feb. 23, 1993, now abandoned.

FIELD OF THE INVENTION

This invention relates to polytetrafluoroethylene molding powders useful in compression molding techniques.

BACKGROUND OF THE INVENTION

Polytetrafluoroethylene (PTFE) is made in two distinct forms by different processes. One form is the so-called "fine powder" form produced by polymerizing tetrafluoroethylene in an emulsion so that the polymer particles do not precipitate. After polymerization is complete the particles are coagulated. This form of PTFE cannot be compression molded. On the other hand, the so-called granular form of polytetrefluoroethylene is produced by polymerization of tetrafluoroethylene and precipitation in situ as the polymerizate forms. This form of polytetrafluoroethylene can be compression molded by taking the polymer powder, filling a mold, compressing the powder in the mold while heating it to coalesce the powder, and then removing the compressed powder from the mold. The resulting molded articles are not as strong as desired and ways of making stronger molded articles of polytetrafluoroethylene are continually sought after.

SUMMARY OF THE INVENTION

In this invention a new form of polytetrafluoroethylene has been found to be compression moldable to provide strong molded articles. It is also useful as an additive or strength binder.

The new form is a compression molding powder comprised of comminuted, sheared particles of expanded porous polytetrafluoroethylene, said particles having a nudular-microfibrillar structure of irregular shape, and a mean particle size between 5 and 500 micrometers, and having a coating of a thermoplastic fluoropolymer on at least a portion of the particle. By irregular shape is meant that the nodes and fibrils do not have an ordered arrangement. The bulk density is about 0.06 to 0.2 g/cc.

To make the particles, a polytetrafluoroethylene substrate, usually in the form of a tape or film, is contacted with a layer, usually a film, of a thermoplastic polymer. The composition is heated to a temperature above the melting point of the thermoplastic polymer; and, the composition of step is then stretched while maintaining the temperature above the melting point of the thermoplastic polymer. Finally, it is cooled.

Depending on the degree of stretching, the thermoplastic film can form a very thin, i.e., 9 micron or less thick, film on the surface of the expanded porous PTFE which is continuous and nonporous.

The coated film or tape is then slit into a fiber width which is suitable for towing easily (i.e. 13 mm to 51 mm wide). Additional expansion of the fiber is helpful before an optional towing step described below, to increase the fiber's tensile strength.

The towing process provides an efficient means for size reducing the slit tape into fine discontinuous fibers. The fine discontinuous fibers are then further size reduced by shredding the fibers into fine staple fibers (about 6 mm (¼ inch) in length). This fiber length is suitable for further size reduction in a colloid mill. Larger fiber lengths should be avoided since they tend to classify within the colloid mill resulting in decreasing the efficiency of the colloid mill. A colloid mill useful to reduce the fine discontinuous staple fiber is a modified Morehouse Super 800 series colloid mill. The Morehouse mill can be modified by securing the mill stones as is taught in U.S. Pat. No. 4,841,623 to Rine.

This modified colloid mill provides a means to size reduce the coated expanded PTFE material to particle sizes down to submicron levels but typically the mill is used to reduce material to particles of an average size of about 40 micrometers. Larger particle sizes are attainable as well e.g. 200 micrometers by varying the coarseness (gdt size) of the milling stones. Additionally, this mill can be adjusted so as not to melt the thermoplastic coating on the expanded PTFE material during the comminution process. The problem of melting the thermoplastic material during comminution is a common problem with other comminution methods and processes.

The operation of the present invention should become apparent from the following description when considered in conjunction with the accompanying drawings:

This material can be used as a molding powder with increased strength due to its superior matrix tensile strength resulting from the expansion process and due to the thermoplastic coating which act as a binder and aids in the strengthening of the molding powder as well. Additionally, the material can be used as an additive or strength binder to other materials such as to carbon black substrates, or to other polymers. The high strength of the comminuted expanded PTFE fibers act as tensors in the substrate and the fluoropolymer coating acts as a binder. Typically, a comminuted particle possessing a defined aspect ratio is desired for this type of application over a spherical or elliptical particle. A pronounced aspect ratio defining the particle's geometry aids in the strength enhancement due to the entangling of particles with themselves and/or other materials when added to composites. The aspect ratio of a particle is a dimensionless number greater than or equal to one and is defined as the particle's length divided by its width or diameter. Additionally, the particle's length is greater than its width or diameter.

DETAILED DESCRIPTION OF THE INVENTION

Figure 1:
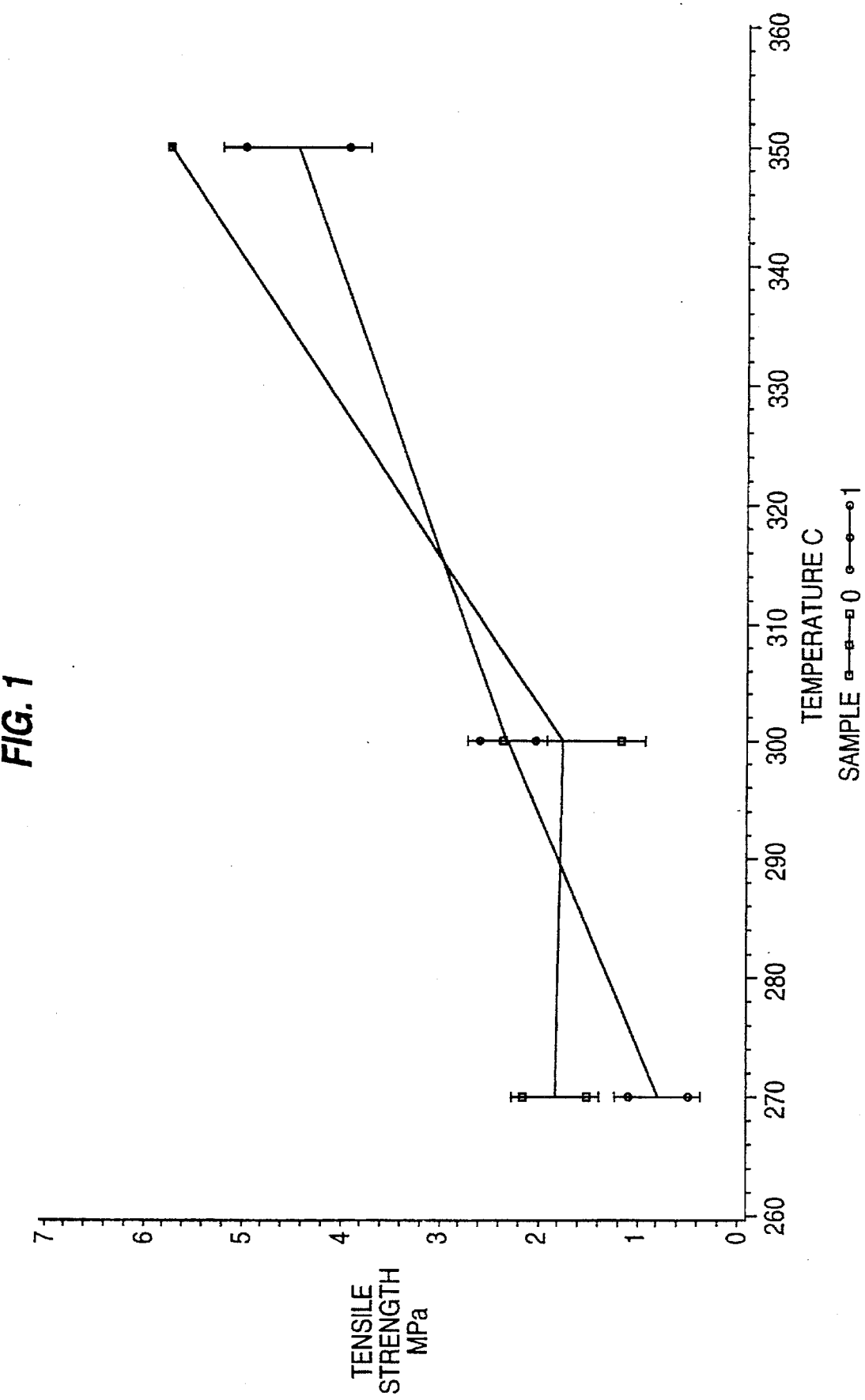
FIG. 1 is a graph of tensile strength versus temperature of compression molded coupons showing that the effect of melting the thermoplastic coating on the expanded PTFE particles increases the tensile strength of the compression molded article.
Figure 2:
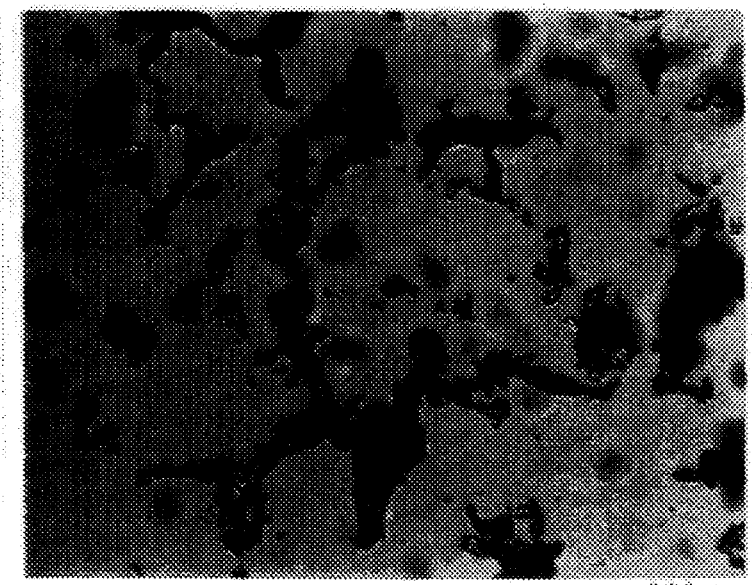
FIG. 2 is a photograph of particles of the present invention enlarged 200 times, showing the irregular shapes and their entangling
Figure 3:
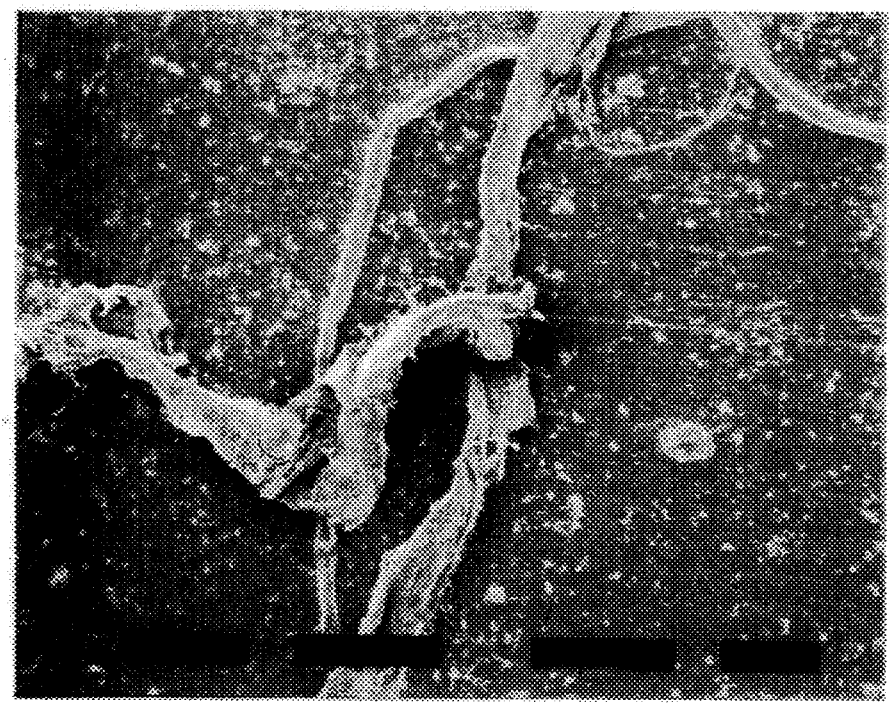
FIG. 3 is an SEM of large particles of the present invention enlarged 100 time showing their definitive aspect ratio and entangling
Figure 4:
FIG. 4 is an SEM of a cross-section of an entanglement of particles of the present invention enlarged 2500 times showing the porous surfaces.

The expansion, i.e., or stretching of polytetrafluoroethylene is a well-known procedure and is described in U.S. Pat.

No. 3,953,566. Preliminarily, the type of PTFE called finepowder, which may contain a filler material, is mixed with a sufficient amount of a hydrocarbon extrusion aid, usually an odorless mineral spirit until a paste is formed. The paste is compressed into a billet and subsequently extruded through a die in a ram-type extruder to form a coherent PTFE shape which can be in the form of a rod, filament, tube or, preferably a sheet or a film.

The coherent PTFE shape is optionally compressed and then dried by volatilizing the hydrocarbon extrusion aid with heat. Volatilization of the extrusion aid results in a coherent PTFE shape having a small degree of porosity. The resulting porous PTFE material is now ready to be coated with the thermoplastic polymer and the coated material expanded. However, if a highly porous expanded PTFE product is desired, a pre-conditioning stretching step can be carried out by stretching at 200° C.–300° C., preferably for about 1.5 to 5 times the original length.

The coherent PTFE shape prior to stretching is combined with a thermoplastic polymeric layer by contacting the thermoplastic polymeric layer with a surface of the coherent PTFE shape. Ordinarily the PTFE is in sheet or membrane form and the thermoplastic polymer is in sheet or film form and the polymer sheet is placed on the PTFE sheet. The combination is heated to a temperature between the melt point of the thermoplastic polymeric layer and about 365° C. The coherent PTFE shape is kept under tension while being heated thereby maintaining its dimensions while the thermoplastic polymeric layer is combined with the coherent PTFE shape. The means for heating the coherent PTFE shape may be any means for heating commonly known in the art including, but not limited to, a convection heat source. The combination heat source may be a heated surface such as a heated drum or die or roll or curved plate. As the coherent PTFE shape is heated to a temperature above the melt point of the thermoplastic polymeric layer, the thermoplastic polymeric layer in contact with the coherent PTFE at least partially softens and adheres to the surface of the coherent PTFE shape thereby forming a composite precursor, i.e., a coated PTFE material ready to be expanded. When a conductive heat source is used as the means for heating the coherent PTFE shape, the surface of the coherent PTFE shape should be against the conduction heat source so as to prevent sticking and melting of the thermoplastic polymeric layer upon the conduction heat source.

The thermoplastic polymeric layer is of a thermoplastic polymer that has a melt point of 342° C. or less. Melting points of thermoplastic polymers were determined by Differential Scanning Calorimetry Techniques. The thermoplastic polymer is a polymer that will bond to the substrate and may be polypropylene, polyamide, polyester, polyurethane, or polyethylene. Preferably, the thermoplastic polymer is a thermoplastic fluoropolymer. Representative thermoplastic fluoropolymers include fluorinated ethylene propylene (FEP), copolymer, copolymer of tetrafluoroethylene and perfluoro(propylvinyl ether) (PFA), homopolymers of polychlorotrifluoroethylene (PCTFE) and its copolymers with tetrafluoroethylene (TFE) or vinylidene fluoride (VF2), ethylene-chlorotrifluoroethylene (ECTFE) copolymer, ethylene-tetrafluoroethylene (ETFE) copolymer, polyvinylidene fluoride (PVDF), and polyvinylfluoride (PVF). Thermoplastic fluoropolymers are preferred as the thermoplastic polymer since thermoplastic fluoropolymers are similar in nature to PTFE, having melt points near the lowest crystalline melt point of PTFE, and therefore are relatively high temperature thermoplastic polymers. Thermoplastic fluoropolymers are also relatively inert in nature and therefore exhibit resistance to degradation from many chemicals.

The coated material is expanded by stretching it according to the method taught in U.S. Pat. No. 3,953,566 to Gore. The temperature range at which expansion of the material is performed is between a temperature at or above the melt point of the thermoplastic polymer layer and a temperature at or below 342° C.

The material may be stretched uniaxially, only in a longitudinal direction; biaxially, in both longitudinal and transverse directions; or radially, in both longitudinal and transverse directions simultaneously. It may be stretched in one or more steps.

The coherent PTFE shape forms an expanded porous PTFE (ePTFE) article as it is stretched. The ePTFE article is characterized by a series of nodes interconnected by fibrils. As the coherent PTFE shape is expanded to form the ePTFE article, the thermoplastic polymer layer adhered to the coherent PTFE shape is carried along a surface of the coherent PTFE shape while in a melted state thereby forming a thin thermoplastic polymer film on the ePTFE article. The thin thermoplastic polymer film is less than 9 microns thick, and preferably has a thickness of one half, preferably one tenth, of the thermoplastic polymer layer's original thickness. For example, a thermoplastic polymer layer originally having a thickness of 1 mil (25.4 microns) could produce a thin thermoplastic polymer film having a thickness as low as 0.1 mil (2.54 microns) or less after expansion of the coherent PTFE shape into the ePTFE article. The thermoplastic polymer layer is in contact with and is carded on a surface of the coherent PTFE shape as the coherent PTFE shape is expanded at a temperature at or above the thermoplastic polymeric film's melt point.

The coated material may be heat set, if desired, to amorphously-lock the expanded porous PTFE structure.

Any suitable apparatus for gdnding or comminuting tough polymeric or elastomeric materials may be used for producing the porous expanded PTFE particles, such as the apparatus disclosed in U.S. Pat. Nos. 4614310 and 4841623. This apparatus employs two parallel stones having a hole in the middle of the stones, affixed on a common axis but secured circumferentially and rotating at high speeds (3600 rpm) in opposite directions of each other. Material to be ground is coarsely cut and mixed with water to produce a wet slurry and then the slurry is placed in the middle of the rotating stones. The material is moved or slung by centrifugal force across the surface of the stones. A hydrodynamic layer is created between the closely spaced rotating stones and the water slurry. This hydrodynamic layer forces the particles on the stone's surface outwards across the stone. Size reduction of the particle occurs as the particle bumps into and along the stone's sharp edges located on the stone's surface as the particle travels along its torturous path from near the center of the stone to the outside of the stone.

It is important that the gap between the stones is kept sufficiently tight so that a strong hydrodynamic layer is maintained between the stones, forcing the particles outwards. If the gap is not sufficiently tight, the particles will ride in the center of the hydrodynamic layer and not touch the stone's surface resulting in no size-reduction of the particle.

The overall amount of size reduction is a function of the stone's grit size and the time the particle is exposed to the stone. The space between the stone comes into play by maintaining a hydrodynamic layer between the stones. Once the gap between the stones is sufficiently narrow to allow size reduction to occur, then any further gap narrowing will not lead to a decrease in particle size. However, the gap dimension is critical to the overall particle size variance. The tighter the gap between the stones after the hydrodynamic layer is created, the more consistent mean particle size is produced. This is due to the probability of particles entering and leaving the hydrodynamic layer during the grinding operation due to the strength of the hydrodynamic layer and the kinetic energy of the particle as it transverses its path between the stones. The tighter the gap between the stones, the less likelihood the particle can enter into the center of the hydrodynamic layer and not be size-reduced.

It is useful to secure the mill stones of a Morehouse Super 800 series colloid mill circumferentially as taught in U.S. Pat. No. 4,841,623 to Rine, as opposed to securing them in the common axial mounting configuration. The circumferentially mounting of the stones permits the stones to withstand higher rotational velocities. When the grinding stones rotate at the increased rotational velocities in the colloid mill, it is found that expanded PTFE can be sized reduced to a mean particle size of 40 micrometers and smaller without severe degradation to the nodal-fibril structure inherent to the expanded PTFE material.

Common size reduction techniques for PTFE and plastics use radiation to render the material brittle to allow the material to be size reduced to particles sizes below 100 micro-meters. Unfortunately, the irradiation process destroys the nodal-fibril structure of the expanded PTFE material. Excessive heat during the irradiation process is not a desirable condition as well since melting of the thermoplastic and or fluorothermoplastic may occur resulting in particle agglomeration. The use of the modified Morehouse Colloid mill provides an alternative to the use of irradiation to yield particles of sized reduced PTFE and size reduced expanded PTFE below 100 micro-meters.

The comminuted particles of porous expanded PTFE retain their nudular-fibrillar microstructure. The particles are characteristically irregularly shaped and may be somewhat ragged as a result of sheafing and splitting the porous expanded PTFE pieces during the grinding process. The particles have a preferred aspect ratio of between 3 and 50 and are entangled. The comminuted ePTFE material, with its high surface are and fibfillar, porous nature, is suited for use as an adhesive due to the adhesive nature of the thermoplastic polymer.

The inventive material can be compression molded into articles of a desired shape or geometry. It was found that the strength of the compression molded article was increased if the molded shape was exposed to a temperature above the melting point of the thermoplastic coating on the particles. For an example, tensile test samples were made in the following manner:

Approximately 6.0 grams of comminuted ePTFE material was placed in a steel compression die so to produce tensile coupons the size of 12.7 mm (0.500 inch) wide by 101.6 mm (4.00 inch) long and approximately 2.28 mm (0.090 inch) thick. The final thickness of the coupon was dependent on the quantity of material actually placed in the die. The width and length of the coupon were maintained consistent due to the dimensional stability of the compression die. The material was subjected to a compressive load of 27.6 to 34.5 MPa (4000 to 5000 psi) for a period of five minutes. The direction of the compressive load was normal to the 12.7 mm by 101.6 mm plane of the coupon thus reducing the thickness of the coupon to a thickness of approximately 2.28 mm after compression. The five minute compression load duration was used to permit any entrapped air within the coupons to escape.

Coupons of comminuted ePTFE material having a coating of FEP were made in a similar fashion.

Coupons were then heated at various temperatures 270° C. to 3500° C. by placing the coupons in a forced-air electric oven Model #7780 by the Blue-M Company of Blue Island, Ill. for a period of 30 minutes. The coupons were then removed from the oven and permitted to cool down to ambient temperature under a laboratory hood having a hood face velocity of 100 meter/min.

The tensile strength of the coupons were measured using a tensile tester Model #1130 from the INSTRON Corporation of Canton, Mass. The INSTRON machine was outfitted with clamping jaws which are suitable for securing the coupons during the measurement of tensile loading. The cross-head speed of the tensile tester was 25.4 cm per minute. The gauge length was 44.5 mm.

As shown in FIG. 1, as the coupon is exposed to a temperature above the melt temperature of the FEP, the strength of the molded article is increased whereas the strength of the molded article consisting of uncoated particles remains consistent until the article reaches temperature at and above the coalescing temperature (327° C.) of the PTFE. This improvement in strength is shown discretely for the coupons heated to 300° C. The FEP coating of the small particles act as a binder. This improvement in tensile strength is advantageous and provides an alternative for articles which can not be processed at temperatures where PTFE is needed for coalescing to occur but can withstand temperatures where melting of the thermoplastic coating can occur.

For use in vacuum compression molding polytetrafluoroethylene, the new comminuted porous expanded PTFE coated particles are placed in a mold of a desired shape. A vacuum can be drawn, if desired, and then the material compressed at pressures of between 1500 and 1600 psi (100 and 412 bar) at a temperature between 20° (ambient) and 3800° C. and for a time of between 1 second and several minutes to reach equilibrium. With the use of vacuum and heat, lesser compression loads are required to reach densities greater than 1 g/cc to full density 2.2 g/cc.

Upon removal from the hot mold, the molded article can be cooled then sintered, or can be directly sintered without cooling.

By sintering is meant that the molded article is heated above 327° C. for a period of time to reach equilibrium thermally to coalesce the ePTFE particles.

In one type of molding operation, called hot isostatic molding, the comminuted, porous stretched PTFE particles are placed in a container and enclosed in an air-tight heat resistant wrapping. A vacuum is then drawn on the enclosed material to about 20 inches of mercury (670 millibar). The enclosed vacuumed material is then pressurized in an autoclave to about 200–275 psi (14–19 bar) for 30–60 minutes at 350°–400° C. The molded part is then removed and cooled.

In another type of molding operation, called compression molding, the comminuted, porous stretched PTFE particles are placed in a mold and compressed to 1450–2500 psi (100–172 bar) at room temperature (15°–25° C.). If desired, the compression can take place when a vacuum is pulled on the article. If desired the compression molded article can be sintered at above the 327° C. or at the or above the melt temperature of the thermoplastic coating.

The thermoplastic fluoropolymer is preferably a copolymer of tetrafluoroethylene and hexafluoropropylene (FEP) or a copolymer of tetrafluoroethylene and perfluoro alkyl vinyl ether.

EXAMPLE

A fine powder PTFE resin was combined with a quantity of an odorless mineral spirit and mixed until a paste was formed. The paste was compressed under a vacuum to form a billet, and the billet was subsequently extruded through a die thereby forming a coherent PTFE extrudate.

The coherent PTFE extrudate was compressed between a pair of rollers until a coherent PTFE sheet, 430 micron (0.43 mm) thick, was obtained. The coherent PTFE sheet still contained an amount of the odorless mineral spirit.

The odorless mineral spirit was volatilized from the coherent PTFE sheet by heating, yielding a dry porous coherent PTFE sheet. Subsequently, the dry coherent PTFE sheet was stretched while still hot two (2) times its original length by passing the sheet over a series of gapped rollers driven at differing speeds.

A sheet of a thermoplastic polymer, a copolymer of tetrafluoroethylene and hexafluoropropylene (FEP) 25.4 micron (0.0254 mm) thick (available from E. I. du Pont de Nemours, Co.) was slit so that its width was slightly less than the width of the dry coherent PTFE sheet. The FEP sheet was fed on top of the dry coherent PTFE sheet which in turn was fed across a heated curved plate, heated to a temperature of 340° C. which is above the melting point of the FEP sheet. The two sheets were stretched together 1.2 to 1 to form a laminate. The speed with which the sheets were passed over the heated curved plate was 12.19 m/min. The laminated sheets were slit in half into 100 mm wide strips and stretched in two sequential heating zones; one set at 335° C., the other set at 335° C. as well. The laminate was stretched thirty (30) times its initial length, nominally 20 to 1 on the first plate and 1.5 to 1 on the second plate. The laminate was raised over a third plate at 400° C. and 19 meter/minute.

The strips of tape were subjected to a towing procedure. They were run across a rotating roller. The rotating roller (152 mm diameter by 305 mm long) contained hundreds of pins (0.6 mm diameter by 13 mm exposed length) extending perpendicular to the axis of the roller. The pins were lined up in a series of rows over the surface of the roller (they can be placed in a random fashion over the rollers surface as well). The preferred rotation of the tow machine roller is the direction opposite the direction of the tape moving over the roller.

The tape was punctured and a series of discontinuous slits occurred in the tape as each pin punctures the moving tape and exits the tape as the pin-roll rotates. This discontinuous puncturing operation provides a useful means of slitting the tape by not creating loose ends of threads from the tape. After the towing operation, the tape is rendered as a spider web like structure.

The expanded tow material was then spooled using a normal fiber take-up machine. The denlet of the coated tow material was 11,000 grams/9000 meters (Denier), or equivalently, 1222 dTex where 1 dTex=1 gram/1000 meters.

The tow fiber was cut into 6.35 mm long staple using a mini staple cutter which consist of a 152.4 mm by 12.7 mm diameter (6" by ½" diameter) feeding tube which directs the tow fiber at a rotating 25.4 mm by 76.2 mm long (1" by 3" long) cutting blade. The tow material is fed into the feeding tube by two rotating nip rollers set at a speed so to produce 6.35 mm long staple fiber after it is cut by the rotating cutting blade. The faster the nip rollers rotate feeding the tow fiber into the rotating cutter results in longer staple fiber.

The 6.35 mm long fine staple fibers were then further sized reduced using a modified Morehouse Super 800 series colloid mill. The Morehouse mill is modified by securing the mill stones as is taught in U.S. Pat. No. 4,841,623 to Rine, as described further above.

Tap water was added to the sized reduced material in the hopper which feeds the colloid mill. A water and ePTFE slurry was produced in the hopper with a concentration of water to ePTFE of 50:50. Note that the higher the concentration of ePTFE to water is made, the better the efficiency of the mill. Although there does exists a peak concentration ratio since too much ePTFE to water ratio will result in excessive heat build-up on the stones. The stone must be kept cool during the milling operation. Excessive heat build-up in the stones will render the stone useless as well as the heat will melt the thermoplastic coating on the ePTFE material. The preferred water and PTFE concentration is 35–40% PTFE to 65–60% water to allow for adequate cooling of the stones and the coated ePTFE material.

The size reduced material exits the mill as a slurry. This slurry material was then placed on flat aluminum pans in a forced air convection oven at a temperature of 105° to 150° C. (or a temperature below the melting temperature of the thermoplastic or fluorothermoplastic material coating on the ePTFE material thus preventing sticking and particle agglomeration due to melting of the thermoplastic material) and remains there until the water evaporates.

The pans were removed from the oven and the cake like material was fractured by blending the material using a standard household food blender. The material was sometimes fractured as well by shaking it in a closed container.

The product was a comminuted porous expanded PTFE material comprising finely ground particles of irregular shape.

The comminuted particles preferably will have a mean particle size between 5 and 500 µm, more preferably between 80 and 150 µm. Particle size was determined as follows: using a magnetic stirrer and ultrasonic agitation, 2.5 grams of milled ePTFE powder were dispersed in 60 ml isopropyl alcohol. (Ultrasonic Probe Model W-385, manufactured by Heat Systems-Ultrasonics, Inc.). Aliquots of 4–6 ml of the dispersed particles were added to approximately 250 m of circulating isopropyl alcohol in a Leeds & Northrup Microtrac FRA Particle Size Analyzer. Each analysis consisted of three 30 second runs at a sample circulation rate of 2 liters/minute during which light scattering by the dispersed particles is automatically measured and the particle size distribution automatically calculated from the measurements.

The particles will preferably have an average surface area of between 1 and 4 sq. m/gram as determined by specific surface area measured by the Micromeritics surface area analyzer. The surface area analyzer uses the BET(1) method to calculate surface area. In this sample analysis, the desorption isotherm of a single point analysis was used to calculate the surface area.

I claim:

1. A polymeric molding resin consisting solely of comminuted, sheared, and ground elongated particulate and being made of expanded porous polytetrafluoroethylene, said particulate having a nudular-microfibrillar structure, an irregular shape, a mean particulate size between 5 and 500 micrometers, and having a coating of a thermoplastic fluoropolymer on at least a portion of the particulate, said coating being between 2.54 and 9 micron thick, and said elongated particulate being entangled with one another.

2. The molding resin of claim 1 where the thermoplastic fluoropolymer is a copolymer of tetrafluoroethylene and hexafluoropropylene.

3. The molding resin of claim 1 or 2 wherein the bulk density is between 0.06 and 0.1 g/cc.

* * * * *

UNITED STATES PATENT AND TRADEMARK OFFICE
CERTIFICATE OF CORRECTION

PATENT NO. : 5,658,960
DATED : August 19, 1997
INVENTOR(S) : John Dolan

It is certified that error appears in the above-indentified patent and that said Letters Patent is hereby corrected as shown below:

On the title page, Abstract:

Under item [57], line 7, "modular" should read --nodular--.

Column 1, line 41, "nudular-" should read --nodular- --.

Column 1, line 52, delete "of step" after the word "composition".

Column 4, line 35, correct "gdnding" to --grinding--.

Column 5, line 33, change "nudular" to --nodular--.

Column 5, line 39, change "fibfillar" to --fibrillar--.

Column 7, line 46, change "denlet" to --denier--.

Column 8, line 35, change "250 m" to --250 ml--.

Column 8, line 3, change "nudular" to --nodular--.

Signed and Sealed this

Second Day of December, 1997

Attest:

BRUCE LEHMAN

*Attesting Officer*      *Commissioner of Patents and Trademarks*